United States Patent Office 3,302,862
Patented Feb. 7, 1967

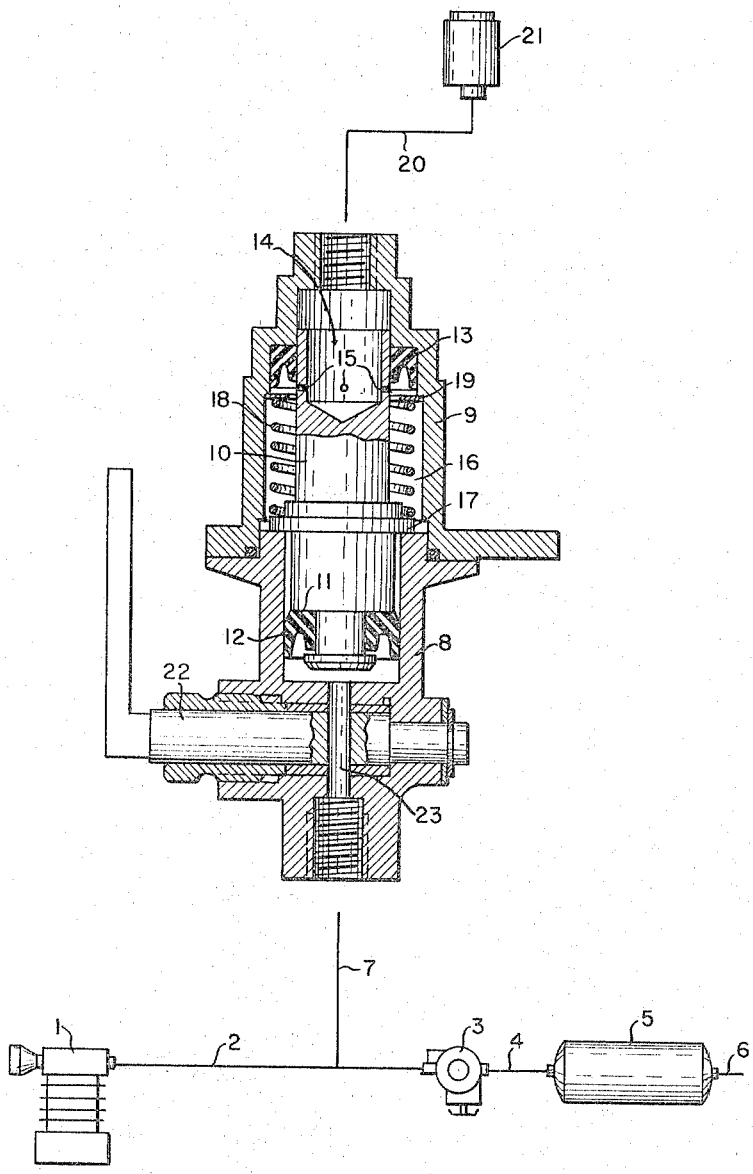

3,302,862
AUTOMATIC INJECTION OF ANTI-FREEZING SOLUTION
Ewald Pekrul, Hannover, Germany, assignor to Westinghouse Bremsen- und Apparatebau G.m.b.H., Hannover, Germany
Filed Oct. 20, 1964, Ser. No. 405,117
Claims priority, application Germany, Nov. 2, 1963, W 35,555
3 Claims. (Cl. 230—1)

This invention relates to a device for automatically and periodically introducing anti-freeze means into the air brake equipment of automotive vehicles.

At external temperatures of less than 0° C. the reliability of operation of the air brake equipment of automotive vehicles is in serious danger since the water vapor contained in the compressed air can condense in the valves and tubing and can cause the moving parts to stick because of the formation of ice.

An effective means for obviating this danger resides in enriching the compressed air with an anti-freeze medium, whereby the freezing point of the condensate is lowered.

It is a known expedient to introduce a liquid anti-freeze means into the line by installing a baffle for the stream of air in the air line and, looking in the direction of flow, by connecting a point in front of this baffle to the upper chamber of the storage tank in such a way that the baffle creates an excess pressure in the storage tank.

There is also known a mechanism for preventing parts from becoming ice-bound by devices operated by compressed air, wherein the change in pressure of the air, stemming from operation of the mechanism, are employed to introduce an anti-freeze means into the devices subject to freezing. This is done by a mechanism consisting of a storage tank for the anti-freeze medium, in which is disposed a supply pump operated by the pressure difference in the line leading to the brake cylinder and which introduces the anti-freeze material into the line to the braking device.

This invention has the object of providing an automatically operating anti-freeze pump that is simple in construction and reliable in operation. The invention resides in the fact that the anti-freeze pump contains a differential piston, whose lower and larger surface is subjected to the changing pressure in the compressed air line, and whose upper portion, closely guided in the casing, is provided with a recess to receive the anti-freeze medium. This recess can be connected, in its normal position, with a pump chamber via bores that can be covered by a sealing ring when the pressure is applied, simultaneously displacing the anti-freeze medium, which moves out of the pump chamber along the lower portion of the differential piston and a grooved ring sealing in only one direction, namely against the pressure in the compressed air line, and is conducted to the compressed air line.

In the more detailed structure the differential piston is held in its normal position by a spring which presses at one end against a shoulder provided on the differential piston and at the other end against the casing.

The anti-freeze pump can be disconnected by a conventional type of shut-off cock.

Further details are evident from the accompanying drawing of an exemplary embodiment, which illustrates a section through such a pump.

From the compressor 1 driven by an internal combustion engine not shown in the drawing, a line 2 leads through a pressure regulator 3 and a line 4 to the main air storage tank 5. A line 6 is connected to a brake valve, not shown. A branch 7 connects the line 2 to an anti-freeze pump, which comprises the lower casing part 8 and the upper casing part 9. A displaceable differential piston 10 is provided in the casing and a grooved flexible sealing ring 12 is securely attached to the lower surface 11 of the piston. The surface 11 of the differential piston 10 is of somewhat smaller diameter than the cylindrical bore in the lower casing part 8, so that an annular chamber or crevice is formed. The upper part of the differential piston 10, having a smaller diameter than the lower part of the piston 10, is closely guided in the upper casing part 9. For this purpose a grooved flexible sealing ring 13 is mounted in the upper part of the casing. The differential piston 10 has a recess 14 in its upper portion, in which bores 15 are provided, which lead to a pump chamber 16 provided between the upper casing part 9 and the differential piston 10. An abutting ring 17 serves on the one side to limit the stroke of the differential piston 10 in the downward direction and on the other side as a seat for a spring 18, top turn of which rests against a ring 19 mounted in the casing. A tank 21, filled with anti-freeze material, is connected to the upper casing part through a line 20. Further, in the lower casing part 8 a conventional type of shut-off cock 22 is provided, which serves to disconnect the anti-freeze pump from the line 2.

The manner of operation is as follows:

In the normal position of the anti-freeze pump, anti-freeze medium flows from the tank 21 through the line 20 into the upper chamber of the anti-freeze pump and into the recess 14, then through the bores 15 into the pump chamber 16 and therefore also fills the annular space present between the lower part of the differential piston 10 and the lower casing part 8. Flow of the anti-freeze material into the pressureless line 7 is avoided by virtue of the fact that the grooved ring 12 has lip tension so great that the anti-freeze medium cannot pass downwardly past it.

During operation of the internal combustion engine, the compressor 1 sends compressed air through line 2 and the pressure regulator 3 to the tank 5, according to the maximum pressure set at the regulator 3. Pressure also builds up in the line 7 and beneath the differential piston 10, which pressure, when it reaches a certain level, moves the differential piston 10 upwardly against the force of the spring 18. At such time the bores 15 are covered by the sealing lip of the grooved ring 13, so that the flow of the anti-freeze material from the line 19 is interrupted. The anti-freeze medium in the pump chamber 16 is then conducted past the grooved ring 12, the bore 23 provided in the cock 22, into the line 7 and the line 2 and is mixed with the compressed air.

When the line 2 again becomes pressureless, the differential piston is moved downwardly by the force of the compression spring 18, until it rests with the shoulder 17 on the lower casting part 8, and the bores 15 again open. Now the pump chamber 16 can again fill with anti-freeze material, supported by the suction effect of the piston 10 during its downward movement.

What is claimed is:

1. A device for automatically and periodically introducing anti-freeze material into the air brake equipment of automotive vehicles by means of an anti-freeze pump, characterized by the fact that the anti-freeze pump contains a differential piston whose lower and larger surface can be encountered by the changing pressure in the compressed air line, and whose upper part, closely guided in the casing, is provided with a recess to receive the anti-freeze material, said recess being capable of being connected, in its normal position, with a pump chamber through bores that can be covered over, wherein said bores can be closed by a sealing ring when pressure is applied, while the anti-freeze material is simultaneously displaced, moving out of the pump chamber along the lower part of the differential piston and a grooved ring which seals in one direction only, namely against the pressure of the compressed air line, and arriving in the compressed air line.

2. A device according to claim 1, characterized by the fact that the differential piston is held in its normal position by a spring which in turn is supported at one end on a shoulder provided on the differential piston and at the other end against the casing.

3. A device according to claim 1, characterized by the fact that the anti-freeze pump can be disconnected by a shut-off cock.

References Cited by the Examiner
UNITED STATES PATENTS

| | | | |
|---|---|---|---|
| 1,689,557 | 10/1928 | Mordell | 103—52 |
| 2,438,658 | 3/1948 | Fitch | 230—2 |
| 2,893,625 | 7/1959 | Gresko | 230—202 |

LAURENCE V. EFNER, *Primary Examiner.*